J. B. GREENE.
DEMOUNTABLE RIM.
APPLICATION FILED JULY 9, 1917.

1,257,845.

Patented Feb. 26, 1918.

WITNESSES

INVENTOR
J. B. Greene
BY Victor J. Evans
ATTORNEY

UNITED STATES PATENT OFFICE.

JAMES B. GREENE, OF LOWNDESBORO, ALABAMA.

DEMOUNTABLE RIM.

1,257,845. Specification of Letters Patent. Patented Feb. 26, 1918.

Application filed July 9, 1917. Serial No. 179,483.

*To all whom it may concern:*

Be it known that I, JAMES B. GREENE, a citizen of the United States, residing at Lowndesboro, in the county of Lowndes and State of Alabama, have invented new and useful Improvements in Demountable Rims, of which the following is a specification.

This invention relates to resilient tires and wheels, and more especially to demountable rims for pneumatic tires; and the object of the same is to produce a rim of this character which can be slipped laterally off the wheel-felly, two nuts and two spacing plates removed, and the rim knuckled or "broken" inward at one point to reduce its length circumferentially so that the beads of the tire can be quickly disengaged from the flanges of the rim and the whole tire taken off in a few minutes.

Details of my preferred construction are set forth in the following specification, reference being had to the accompanying drawings wherein:—

Figure 1:
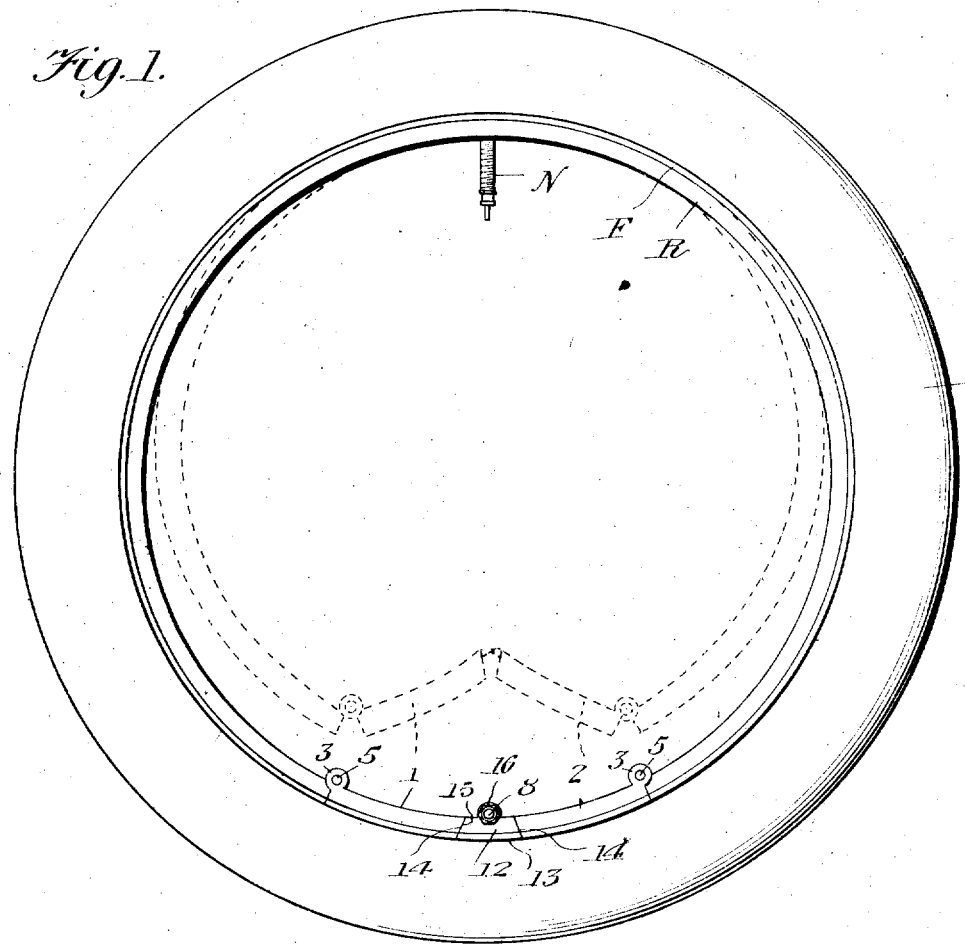
Figure 1 is a side elevation of this rim and parts of a tire casing thereon and connected therewith in full lines, the dotted lines showing the rim as knuckled or reduced in size so as to make it smaller than the casing whereby the latter can be removed.

The letter C designates a tire casing of any type but which we may assume has the usual beads along its edges. Within it is an inflatable tube whose nipple N is shown in Fig. 1 as opposite that part of the rim which constitutes the feature of my invention. Said rim is broadly designated by the letter R, and along its edges it has inturned flanges F intended to engage the beads on the casing in a manner well understood. The wheel is not illustrated, but its felly is of a size to fit closely within the rim when the latter is distended to its full size as seen in full lines in Fig. 1, and the felly will have in its outer face transverse grooves for the knuckles yet to be described. The felly will also have at an appropriate point an opening through which the nipple N projects as usual. All these details are well understood, and need no further illustration or description.

Figure 2:
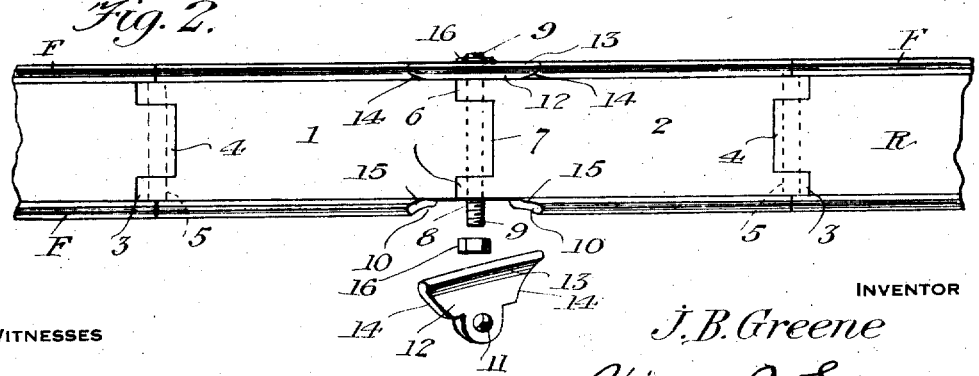
Fig. 2 is an enlarged bottom plan view of that portion of the rim in Fig. 1 which contains the knuckle or toggle lever, one spacer and its nut being in place and the other removed and shown slightly in perspective.

Coming now to the present invention, I make the rim R of metal and the side flanges F preferably integral therewith, and in its completed condition this rim is entirely annular and fits closely within the beaded inner edge of the casing C, assuming of course that the casing is of proper size to fit the rim. At one point in the latter—at a point herein shown opposite the nipple N, although this is not necessary—the continuity of the rim is broken, and the break or gap is closed up by rim-sections or leaves 1 and 2 which in effect form the links of a toggle joint as seen in dotted lines in Fig. 1. Each leaf is provided at its outer end with knuckles 3 interengaged with other knuckles 4 on the body of the rim R, and a pivot bolt or pin 5 passes through the alined knuckles as seen. These knuckles by preference project radially inward as best seen in Fig. 1, and if so the periphery of the felly must be provided with channels or cross grooves to receive them; but the result is that each leaf is connected with the body of the rim by a knuckle joint so that the leaf may fold inward but may not fold outward further than to a position where it alines with the rim as seen in full lines in Fig. 1. The meeting ends of said leaves are likewise provided with knuckles 6 and 7 interengaging with each other, and through them passes a pivot bolt 8 having both ends threaded as at 9. These knuckles also may be on the inner side of the body of the rim R, and will require a groove or channel in the felly like the others, but they do not produce a knuckle-joint because the flanges F are cut away to both sides of both ends of the pivot 8 as seen at 10 in Fig. 2. However, the toggle joint as a whole does not need a knuckle joint at its center if it has knuckle joints at its outer ends as just described: therefore, when this toggle is sprung outward as seen in full lines in Fig. 1 its links aline with the rim-ends R and fit closely within the tire casing C. Obviously when this toggle joint is sprung inwardly or the rim "broken" as suggested above, the rim-ends approach each other and the entire contour of this element is reduced so that it becomes smaller than the casing, and the beads of the latter can be disengaged from the flanges of the rim, and the casing removed very quickly. Manifestly such breaking of the rim can not occur while the same is on the felly.

Onto each threaded end 9 of the pivot bolt 8 is slipped the eye 11 of a spacing block 12, and the latter is preferably flanged along its radially outer edge as at 13 and beveled at its extremities as at 14. Such beveling is to complement the cut-away or beveled flanges along the edges of the leaves 1 and 2, as indicated at 15 in Fig. 1, where such bevels are in close contact with the bevels 14 of the block 12. Finally a nut 16 is applied to the threaded ends 9 and set up tight to hold the block in place, and when it is so locked in place it prevents the accidental or possible knuckling or breaking of the rim when slipped off the felly, which might occur before the workman was ready.

The use of this device is as follows: Assuming that a tire needs repairs, the demountable rim R is first disconnected from the felly F on which it will be fastened by means not necessary to show herein as they constitute no part of the present invention. It is then slipped laterally off said felly at the lower side as seen in Fig. 1, and raised slightly so that the nipple N comes out of the felly at the upper side, the wheel of course at this time being jacked up off the ground. The motorist now removes the nuts 16, slips the spacing blocks off the extremities of the bolt 8, inserts any suitable tool, or perhaps his finger, between one of the leaves 1 or 2 and the tire C, and pries the toggle lever inward. Immediately it springs to the position shown in dotted lines in Fig. 1, because we must assume that the air tube is deflated and the casing C rather soft so that its leaves do not positively engage with the flanges F: otherwise it will be necessary for the motorist to disengage the beads and flanges along the leaves and on the rim adjacent thereto.

The repairs to the tire are now made. We may assume that there is involved only the substitution of a new tube. When this has been accomplished, the tire is restored to the rim by a reversal of the process given.

its beads engaged with the flanges thereof, the toggle lever sprung outward, the entire structure put back on the felly, and the tube inflated. During the handling of this rim after it has been taken off the felly and before the casing is removed and again after the casing has been reapplied before the rim is put back on the felly, the toggle structure can not "break" inward accidentally or undesirably so long as the spacing blocks 12 are in place because their beveled ends 14 contact accurately with the beveled extremities of the leaves in the manner already described, and this I consider an important feature of my invention.

What is claimed as new is:—

1. The herein described demountable rim comprising a body section flanged along both edges and extending around nearly a complete circle, two short sections hinged to each other and to the ends of said body section and completing said circle, flanges along the edges of said short sections cut away on both sides of the pivot between them, and spacing blocks detachably mounted on the ends of said pivot, shaped to fill out the cut-away portions of the flanges, and themselves having flanges alining with the others when the blocks are in place.

2. The herein described demountable rim comprising a body section flanged along both edges and extending around nearly a complete circle, two short sections hinged to each other and to the ends of said body section and completing said circle, flanges along the edges of said short sections cut away on opposite sides of the intermediate pivot and on diverging lines, spacing blocks whereof each has an eye to pass over one end of said intermediate pivot and its ends beveled to fit said cut-away flanges, and fastening devices on the ends of the pivot to hold said blocks in place.

In testimony whereof I affix my signature.

JAMES B. GREENE.